Sept. 9, 1958 L. BENJETSKY 2,851,084
CHILD'S DEMOUNTABLE AUTO SEAT
Filed Dec. 13, 1955

INVENTOR.
Louis Benjetsky

United States Patent Office 2,851,084
Patented Sept. 9, 1958

2,851,084
CHILD'S DEMOUNTABLE AUTO SEAT
Louis Benjetsky, Roslyn, Pa.
Application December 13, 1955, Serial No. 552,813
12 Claims. (Cl. 155—11)

The present invention relates to a child's demountable auto seat and more particularly to an easy access child's demountable auto seat having an upper thorax safety belt to limit forwardly arcuate movement of the upper body in the event of sudden deceleration of the conveying vehicle.

Prior art has thus indicated that little or no emphasis has been afforded safety features in the design of children's auto seats. In some cases, lap type safety belts are incorporated, however, these prove incapable of limiting arcuate movement of the upper body in the event of sudden deceleration. This fact is of prime importance in the case of smaller children who have not, as yet, acquired the inherent ability to brace themselves in the event of an abrupt deceleration.

In other instances, safety belt fastening and tension adjustments necessitate separate manual operations each time the child is placed on or removed from the seat. Another attendant disadvantage of relating prior art is the required cumbersome and awkward method of mounting and demounting the child on the seat. This entails, in part, raising the child's legs and body in a substantially horizontal position over the arm portion, which is usually a distance of approximately eight to ten inches above the seat level, and thence carefully lowering same into seated position.

The instant invention, as will be noted, tends to overcome the apparent above mentioned disadvantages by incorporating a multi-purpose, single operation device which includes a pivotally mounted arm rest in conjunction with an upper thorax preadjusted safety belt which may be positioned unobstructively, thereby permitting relatively effortless mounting and dismounting of the child.

An object of the instant invention is to provide a child's auto seat with a preadjustable safety belt which is positioned and locked simultaneously with the arm rest.

A further object is to provide a child's auto seat which would permit relatively easy positioning and removal of the child.

Still a further object is to provide, in a child's auto seat, a substantially one piece seat construction which would permit a single stamping operation thus reducing the cost of manufacture.

Figure 1:
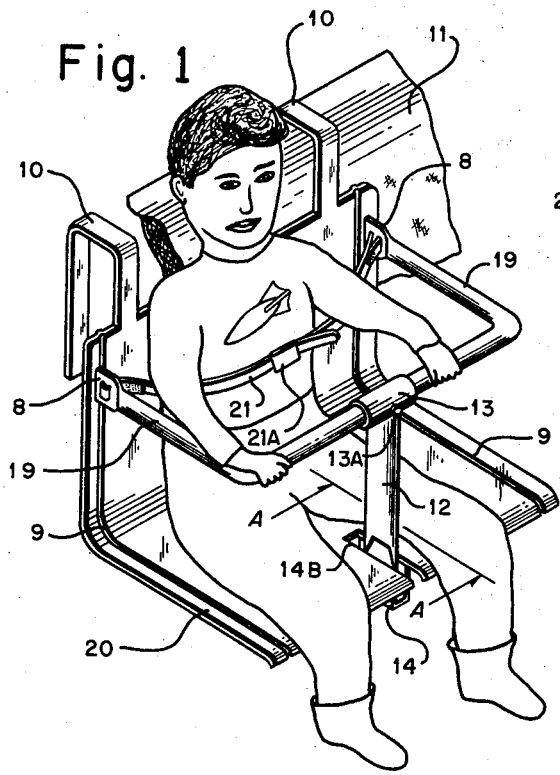
Figure 5:
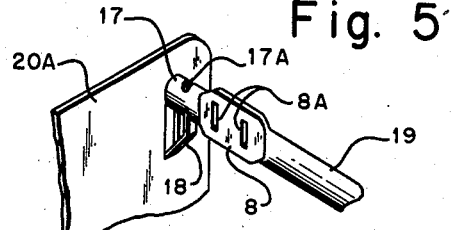
Figure 6:
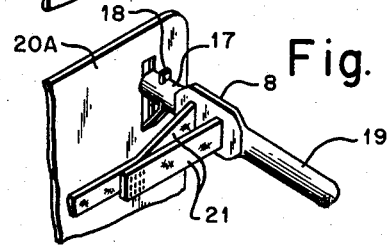
Figure 7:
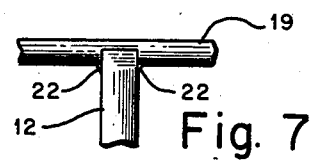
Figure 2:
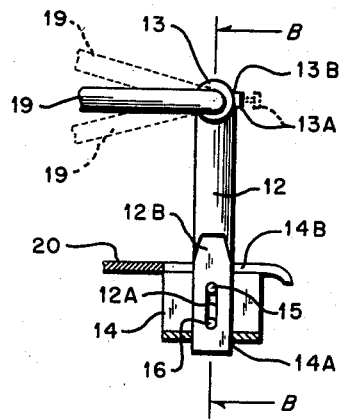
Figure 3:
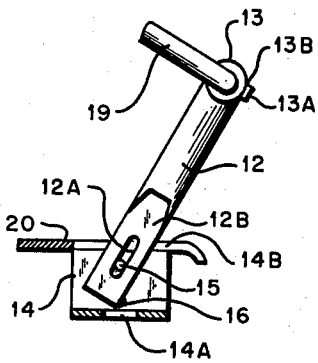
Figure 4:
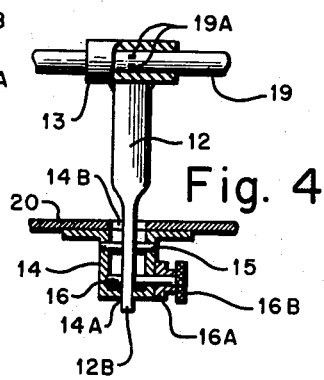

Subsequent objects and advantages will become apparent in more detail in the explanation of the appended specification and the annexed drawing in which:

Fig. 1 represents an overall isometric view of the child's auto seat assembly,

Fig. 2 is a partial section of the pivot arm assembly taken on the line A—A of Fig. 1, Fig. 3 shows a view of the pivot arm assembly in tilted position in partial section, Fig. 4 is a view of the pivot arm assembly taken on line B—B of Fig. 2 in partial section, Fig. 5 indicates a partial alternate configuration of the seat back and U-bar showing a latch assembly in partially closed position, Fig. 6 is the configuration of Fig. 5 with the latch assembly in fully closed position, and Fig. 7 is an alternate configuration of attachment means between the U-bar and pivot arm assembly.

Referring to the drawing wherein like reference numerals designate like or corresponding parts throughout the several views, there is shown in Fig. 1 a representation of a child's auto seat in locked and normal position.

The one piece seat 20 and seat back 20A are maintained in removably fixed relation to the existing auto seat 11 by means of hangers 10 which are fixedly secured by weld or rivets or made integral with seat back 20A, as shown. Of course, only one hanger 10, of sufficient width, may be incorporated if desired.

Reinforcing grooves 9 are pressed into the seat 20 and seat back 20A to provide sufficient rigidity to withstand all encountered stresses. This type of reinforcing may, of course, be substituted by one of many other combinations already well known in the art.

Bracket 14 is fixedly secured by weld or rivets (not shown) to the seat 20 to straddle the opening 14B as clearly indicated in Fig. 4. This could also be integrally formed with the seat 20 by means of a simultaneous stamping process. Locking pin holder 16A is in fixed relationship with bracket 14.

The pivot bar 12 is pivotally mounted at elongated slot 12A on flattened portion 12B to bracket 14 by pivot pin 15 and releasably engaged in opening 14A. A simulated steering wheel or other toy may be mounted on pivot bar 12 as an optional feature also well known in the art.

Collar 13 is fixedly secured to pivot bar 12. U-bar 19 is pivotally secured in collar 13. Locking pin 13A is inserted through collar 13 at opening 13B and passes through one of circumferentially disposed slots 19A, thus restraining movement of U-bar 19. In the unrestrained position, as indicated by dotted lines in Fig. 2, the locking pin 13A is withdrawn, thereby permitting pivotal movement for adjusting of U-bar 19, as required. The pivotable movement of U-bar 19 is an optional feature of the instant invention and may be omitted, if desired, by providing a direct weld 22 (as shown in Fig. 7) or integrally mounting U-bar 19 to pivot bar 12.

Referring again to Fig. 1, both ends of U-bar 19 are formed into flattened portions 8 so as to receive the belt 21 through slots 8A. The belt 21 is tensionally adjusted by means of belt buckle 21A. Various possible means for fastening and tension adjustment of the belt 21 to the U-bar 19 are well taught in the art and may be substituted as desired. For instance, the ends of belt 21 may be fitted with latching members to be releasably engaged on U-bar 19 with a plurality of transversally disposed pairs of slots 8A in a horizontally disposed plane.

In actual operation of the instant invention, the child is placed on the seat 20 while the pivot bar 12 is in a substantially horizontal plane. The pivot bar 12 is then manually shifted into the vertical position and simultaneously lifted outwardly until pivot pin 15 is located at the lower end of elongated slot 12A. Pivot bar 12 is then lowered into opening 14A of bracket 14 at flattened portion 12B and locking pin 16 is thrust through elongated slot 12A by manual movement of locking button 16B. Thus, pivot bar 12, U-bar 19 and belt 21 (which by now is located at approximately the child's chest level and preadjusted tensionally to comfort) are restrained from movement in any direction thereby maintaining a stable prohibition of arcuate movement of the child's body from the hip level and up.

If desired, a suitable additional latching device may be incorporated as shown in Figs. 5 and 6. In this showing, a latch extension 17 is formed integrally with flattened portion 8 on U-bar 19. A latch slot 17A is formed to receive latch 18 which is formed integrally with seat back 20A.

In Fig. 5 the latch assembly is shown in partially closed position. (Note: The belt 21 is not shown for purposes of clarity.)

In Fig. 6 the latch assembly is shown in the fully closed position. This is accomplished when the pivot bar 12 at flattened portion 12B is inserted into opening 14A of bracket 14 in a downward direction.

The pivot bar 12 and the U-bar 19 may be composed of either bar or tubing stock.

It should be understood, of course, that the foregoing disclosure relates only to a preferred embodiment of the instant invention and that numerous modifications or alterations of the apparatus disclosed may be made without departing from the spirit and the scope of the invention as set forth in the appended claims.

What is claimed is:

1. In a child's demountable auto seat; a seat member, a back member connected to said seat member, means for maintaining rigid cooperation between said seat and back members, a hanger member connected to said back member, a pivotally mounted post member on said seat member, a latch member mounted on said seat member for restraining movement of said post member, a bifurcated member perpendicularly disposed and fixedly mounted on said post member, restraining means interconnecting the respective extremities of said bifurcated member.

2. The child's demountable auto seat of claim 1; latch means for restraining movement of said bifurcated member.

3. In a child's demountable auto seat; a seat member, a back member connected to said seat member, means for maintaining rigid cooperation between said seat and back members, a hanger member connected to said back member, a pivotally mounted post member on said seat member, a latch member mounted on said seat member for restraining movement of said post member, a bifurcated member pivotally mounted on said post member, a latch member on said post member for restraining movement of said bifurcated member, restraining means interconnecting the respective extremities of said bifurcated member.

4. In a child's demountable auto seat; an integrally formed seat member, back member and hanger member, a pivotally mounted post member on said seat member, a latch member mounted on said seat member for restraining movement of said post member, a bifurcated member fixedly mounted on said post member, restraining means interconnecting the respective extremities of said bifurcated member.

5. In a child's demountable auto seat; an integrally formed seat member, back member and hanger member, a pivotally mounted post member on said seat member, a latch member mounted on said seat member for restraining movement of said post member, a bifurcated member pivotally mounted on said post member, a latch member on said post member for restraining movement of said bifurcated member, restraining means interconnecting the respective extremities of said bifurcated member.

6. In a child's demountable auto seat; a horizontally disposed seat member, a vertically disposed back member, reinforcing means for maintaining rigid structural cooperation between said seat member and said back member, means for supporting said seat and back members in demountable relationship to an existing auto seat, a bracket member on said seat member at its forward end, a post of rigid construction pivotally mounted on said bracket member, latching means on said bracket member for maintaining said post in vertical relationship to said seat member, said post to assume a substantially horizontal plane when in the unrestrained position, a bifurcated member mounted centrally its shank portion on said post at its end opposite its pivotally disposed portion, said bifurcated member being perpendicularly disposed at its shank portion about said post, said bifurcated member disposed in a plane above and parallel to the seat plane and assuming the general outline of the seat edges thereunder, means for mounting a flexible member transversally to each branch of said bifurcated member, means for adjusting tension of said flexible member.

7. In a child's demountable auto seat; a horizontally disposed seat member, a vertically disposed back member, reinforcing means for maintaining rigid structural cooperation between said seat member and said back member, hanger means for releasably mounting said back member to an existing auto seat, bracket means on said seat member at its forward end, a horizontally disposed first slot on said bracket means, a post member releasably engaged in said first slot, an elongated second slot through said post member, a first pin member horizontally disposed through said second slot and fixedly secured at its ends to said bracket means, a second pin member horizontally disposed and releasably engaged through said second slot at its opposite end, means for mounting said second pin member in slidable engagement with said bracket means, a bifurcated member containing a shank portion, a first branch and a second branch, mounted centrally its shank portion on said post member, said bifurcated member to be perpendicularly disposed about said post member, a flexible member transversally disposed between said first branch and said second branch of said bifurcated member, means for mounting said flexible member at its ends to said first branch and said second branch of said bifurcated member respectively, means for adjusting tension of said flexible member.

8. In the child's demountable auto seat of claim 7; latching means for releasable connection of said first and second branches of said bifurcated member to said back member.

9. In a seating device; a seat member, a back member connected to said seat member, means for maintaining rigid cooperation between said seat and back members to form a structural unit, means for detachably mounting said structural unit to a foreign member, such as an auto seat, a post member mounted on said structural unit, a bifurcated member pivotally mounted intermediate its ends on said post member, latching means for maintaining said bifurcated member in a plurality of fixed positions.

10. In the device of claim 9; transverse restraining means connected to opposing portions of said bifurcated member.

11. In a child's demountable auto seat; a seat member, a back member connected to said seat member, means for maintaining rigid cooperation between said seat and back members, a hanger member mounted on said back member, a pivotally mounted post member on said seat member, a bifurcated member perpendicularly disposed and fixedly mounted on said post member, restraining means interconnecting the respective extremities of said bifurcated member, latch means for releasable connection of said bifurcated member and said back member.

12. In a child's demountable auto seat; a seat member, a back member connected to said seat member, means for maintaining rigid cooperation between said seat and back members, a hanger member connected to said back member, a rigid post member pivotally mounted on said seat member, latching means for restaining movement of said post member, a bifurcated member perpendicularly disposed to and mounted on said post member, transverse restraining means connected to opposing portions of said bifurcated member.

References Cited in the file of this patent

UNITED STATES PATENTS

| | | |
|---|---|---|
| 518,070 | Morfoot | Apr. 10, 1894 |
| 930,839 | Cleary | Aug. 10, 1909 |
| 1,267,590 | Ream | May 28, 1918 |
| 1,902,367 | Johnson | Mar. 21, 1933 |
| 2,532,812 | Huber | Dec. 5, 1950 |
| 2,535,212 | Johnson | Dec. 26, 1950 |
| 2,628,666 | Hall | Feb. 17, 1953 |
| 2,670,787 | Vandas et al. | Mar. 2, 1954 |